US010851946B2

United States Patent
Euwer et al.

(10) Patent No.: US 10,851,946 B2
(45) Date of Patent: Dec. 1, 2020

(54) PRESSURE VESSEL AND DOOR ACTUATOR

(71) Applicant: National Oilwell Varco, L.P., Houston, TX (US)

(72) Inventors: Mark C. Euwer, Richmond, TX (US); Barry G. Jansma, Spring, TX (US); Thomas Tuan-Huy Do, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 164 days.

(21) Appl. No.: 16/126,145

(22) Filed: Sep. 10, 2018

(65) Prior Publication Data

US 2019/0003651 A1    Jan. 3, 2019

Related U.S. Application Data

(62) Division of application No. 15/375,227, filed on Dec. 12, 2016, now Pat. No. 10,107,402.

(51) Int. Cl.
| | |
|---|---|
| *F17C 13/04* | (2006.01) |
| *F16J 13/18* | (2006.01) |
| *F16J 13/20* | (2006.01) |
| *F16K 1/20* | (2006.01) |
| *F16K 35/02* | (2006.01) |

(52) U.S. Cl.
CPC ............... *F17C 13/04* (2013.01); *F16J 13/18* (2013.01); *F16J 13/20* (2013.01); *F16K 1/205* (2013.01); *F16K 1/2007* (2013.01); *F16K 1/2028* (2013.01); *F16K 35/025* (2013.01)

(58) Field of Classification Search
CPC .... F16J 13/08; F16J 13/20; F16J 13/24; F16J 13/10; F16J 13/18; B65D 90/10; F16L 55/136; Y10T 292/212; F17C 13/04; F16K 1/2007; F16K 1/2028; F16K 1/205; F16K 35/025
USPC ..... 49/41, 371; 292/259, 260, 257; 220/315, 220/319, 320, 321, 238, 314, 810
See application file for complete search history.

(56) References Cited

U.S. PATENT DOCUMENTS

| | | | | |
|---|---|---|---|---|
| 2,154,545 | A | * | 4/1939 | Thwaits ................... F16J 13/20 |
| | | | | 220/314 |
| 4,145,259 | A | * | 3/1979 | Leumann ................ C10B 25/06 |
| | | | | 202/248 |

(Continued)

OTHER PUBLICATIONS

"NOV Sentry Closure," https://www.youtube.com/watch?v=ZiNyi4ZyUQg, Apr. 1, 2015 (1 p.).

(Continued)

*Primary Examiner* — Kareen K Thomas
(74) *Attorney, Agent, or Firm* — Conley Rose, P.C.

(57) ABSTRACT

A door assembly for a pressure vessel includes a door, a hub to attach to the pressure vessel and to receive the door, and an annular seal to seal between the door and the hub. A hinge arm is coupled to the hub and to the door and is able to pivot relative to the hub about a hinge axis. A door actuator having an elongate member extending along an actuator axis is spaced-apart from the hinge axis and coupled to the hub and to the hinge arm. The elongate member travels with the hinge arm when the arm pivots relative to the hub, and rotates about the actuator axis. The door actuator is configured to cause the seal to engage sealingly the hub and the door.

10 Claims, 4 Drawing Sheets

(56) References Cited

U.S. PATENT DOCUMENTS

| | | | | |
|---|---|---|---|---|
| 4,341,041 | A | * | 7/1982 | Bloomfield .............. F16J 13/18 |
| | | | | 220/314 |
| 5,056,678 | A | * | 10/1991 | Grills ..................... B64D 11/02 |
| | | | | 220/234 |
| 6,439,415 | B1 | | 8/2002 | Salim et al. |
| 7,802,694 | B2 | * | 9/2010 | Lee ........................... B01J 3/03 |
| | | | | 220/582 |
| 8,297,463 | B2 | * | 10/2012 | McQuaid ................. F16J 13/20 |
| | | | | 220/323 |
| 8,596,484 | B1 | | 12/2013 | Haibel |
| 9,056,701 | B1 | | 6/2015 | Haibel et al. |
| 9,097,346 | B1 | | 8/2015 | Rowland et al. |
| 9,821,953 | B2 | * | 11/2017 | Sewell ................ B65D 90/008 |
| 2009/0084791 | A1 | * | 4/2009 | Haibel .................... F16J 13/20 |
| | | | | 220/321 |
| 2009/0260290 | A1 | * | 10/2009 | McQuaid ................. F16J 13/20 |
| | | | | 49/41 |
| 2013/0025209 | A1 | * | 1/2013 | Lidster .................... F16J 13/18 |
| | | | | 49/359 |

OTHER PUBLICATIONS

"Sentry Closure," NOV Completion & Production Solutions, nov. com/midstream (2 p.).

Office Action dated Dec. 14, 2017, for U.S. Appl. No. 15/375,227 (6 p.).

Response to Office Action dated Dec. 14, 2017, for U.S. Appl. No. 15/375,227; Response filed Mar. 12, 2018 (10 p.).

Notice of Allowance dated Jun. 11, 2018, for U.S. Appl. No. 15/375,227 (12 p.) (12 p.).

* cited by examiner

US 10,851,946 B2

PRESSURE VESSEL AND DOOR ACTUATOR

CROSS-REFERENCE TO RELATED APPLICATIONS

This application claims benefit of U.S. patent application Ser. No. 15/375,227 filed Dec. 12, 2016, and entitled "Pressure Vessel and Door Actuator," which is hereby incorporated herein by reference in its entirety for all purposes.

STATEMENT REGARDING FEDERALLY SPONSORED RESEARCH OR DEVELOPMENT

Not applicable.

BACKGROUND

Field of the Disclosure

This disclosure relates generally to closures for ports on pressure vessels capable of maintaining elevated pressures or vacuums. More particularly, it relates to a pressure vessel door and actuator for the door.

Background to the Disclosure

Certain types of pressure vessels or the entry ports for such vessels include closure assemblies having a round door mounted within a circular hub (door frame) by hinges. Some of these vessels may also or instead by used to hold a vacuum. The port is typically provided for any of a variety of purposes, as examples, to take samples, to clean the vessel, or to add or remove materials within the vessel. To close the entry port, the conventional door is swung toward the hub, and the central axes of the door and hub are aligned. The door has a sealing surface that faces axially-inward, toward the vessel. In turn, the hub typically has an annular sealing surface that faces axially-outward. A resilient seal member is positioned between them. When the door is pushed into the hub and closed, the two sealing surfaces and the seal member engage, forming a radially-extending, pressure energized face seal. Once closed, the door is then held within the hub by actuating a lock mechanism. Forming the face seal and locking the door within the hub are relatively easy tasks, depending on the size of the door. However, the use of a pressure energized face seal limits the level of vacuum that the vessel can maintain, and such seals tend to have limited effectiveness when the vessel needs to maintain at low pressure. Within the industries employing such vessels, a simple-to-use and reliable door and actuator assembly capable of maintaining higher pressures or low vacuums would be welcomed.

BRIEF SUMMARY OF THE DISCLOSURE

These and other needs in the art are addressed in one embodiment by a pressure vessel door assembly. In an embodiment, the pressure vessel door assembly includes a door, a hub configured to receive the door, and an annular seal configured to engage sealingly between the door and the hub. In addition, the pressure vessel door assembly includes a hinge arm coupled to the hub and to the door and configured to pivot relative to the hub about a first hinge axis. Further, the pressure vessel door assembly includes a door actuator having an elongate member extending along an actuator axis spaced-apart from the first hinge axis and coupled to the hub and coupled to the hinge arm, the elongate member configured to travel with the hinge arm when the hinge arm pivots relative to the hub, and configured to rotate about the actuator axis. The door actuator is configured to cause the seal to engage sealingly the hub.

In another embodiment, a pressure vessel door assembly includes a door; a hub configured to receive the door; and an annular seal mounted on the door and configured to engage sealingly between the door and the hub. In addition, the pressure vessel door assembly includes a hinge mechanism coupled between the door and the hub. The hinge mechanism includes a pair of pivot blocks attached to the hub, the pair including a first and a second pivot block. The hinge mechanism also includes a pair of support blocks attached to the door, the pair including a first and a second support block, and the hinge mechanism further includes a hinge arm extending from the pair of pivot blocks to the pair of support blocks and rotationally coupled to the pair of pivot blocks, defining a first hinge axis, the hinge arm configured to pivot relative to the hub about the first hinge axis. The pressure vessel door assembly further includes a door actuator having an elongate member extending along an actuator axis and coupled to the hub and to the hinge arm, the elongate member configured to travel with the hinge arm when the hinge arm pivots relative to the hub, and configured to rotate about the actuator axis. The door actuator is configured to cause the seal to engage sealingly the hub.

In another embodiment, a method for seating a pressure vessel door that includes a door actuator mounted on a hinge arm that supports the pressure vessel door comprises rotating the door actuator relative to the hinge arm, causing an annular seal carried by the door to seal against a hub that surrounds an opening in the pressure vessel. After sealing the door against the hub using the door actuator, the method includes using a lock mechanism that is spaced-apart from the door actuator to lock the door in a position that maintains the seal between the door and the hub. The seal may be an O-ring disposed in a groove around the door, and causing the annular seal to against the hub may include sliding the O-ring into contact with a radially-inwardly-facing cylindrical surface within the hub. In some embodiments, causing the annular seal to seal against the hub includes applying a torque to the door actuator. In some embodiments, the method further includes releasing the torque before using the lock mechanism.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed exemplary embodiments, reference will now be made to the accompanying drawings, wherein.

NOTATION AND NOMENCLATURE

Figure 1:
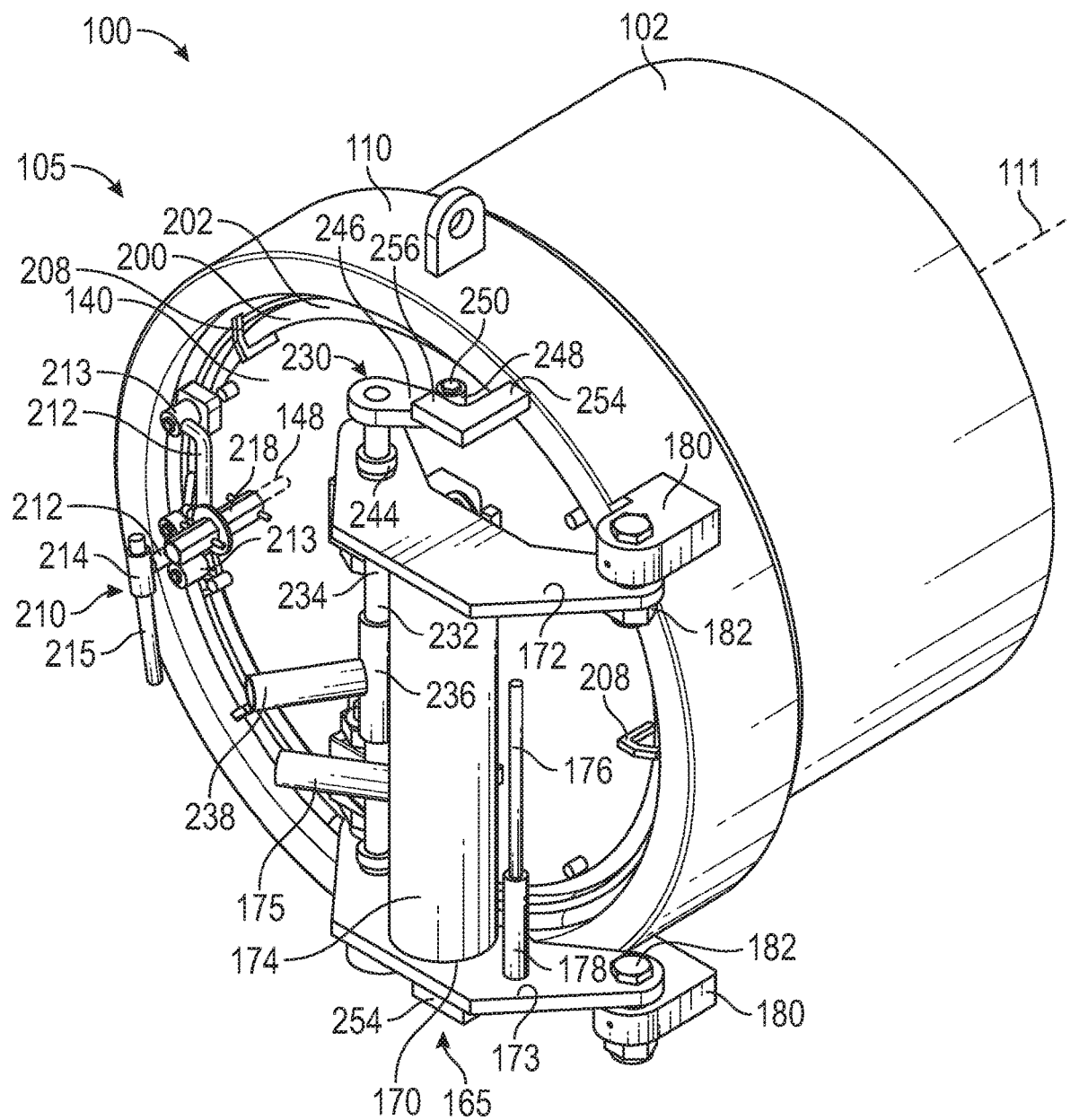
FIG. 1 shows an isometric front view of an embodiment of a pressure vessel door assembly that includes a door actuation mechanism, in accordance with principles described herein.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The figures are not necessarily drawn to-scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the terms "including" and "comprising," as well as derivations of these, are used in an open-ended fashion, and thus are to be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. In addition, recitation "based on" means "based at least in part on." Therefore, if X is based on Y, then X may be based on Y and on any number of other factors. The word "or" is used in an inclusive manner. For example, "A or B" means any of the following: "A" alone, "B" alone, or both "A" and "B."

Further, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis. Furthermore, any reference to a relative direction or relative position is made for purpose of clarity, with examples including "top," "bottom," "up," "upward," "down," "lower," "clockwise," "left," "leftward," "right" "right-hand," "down", and "lower." For example, a relative direction or a relative position of an object or feature may pertain to the orientation as shown in a figure or as described. If the object or feature were viewed from another orientation or were implemented in another orientation, it may be appropriate to describe the direction or position using an alternate term.

DETAILED DESCRIPTION OF THE DISCLOSED EXEMPLARY EMBODIMENTS

Figure 2:
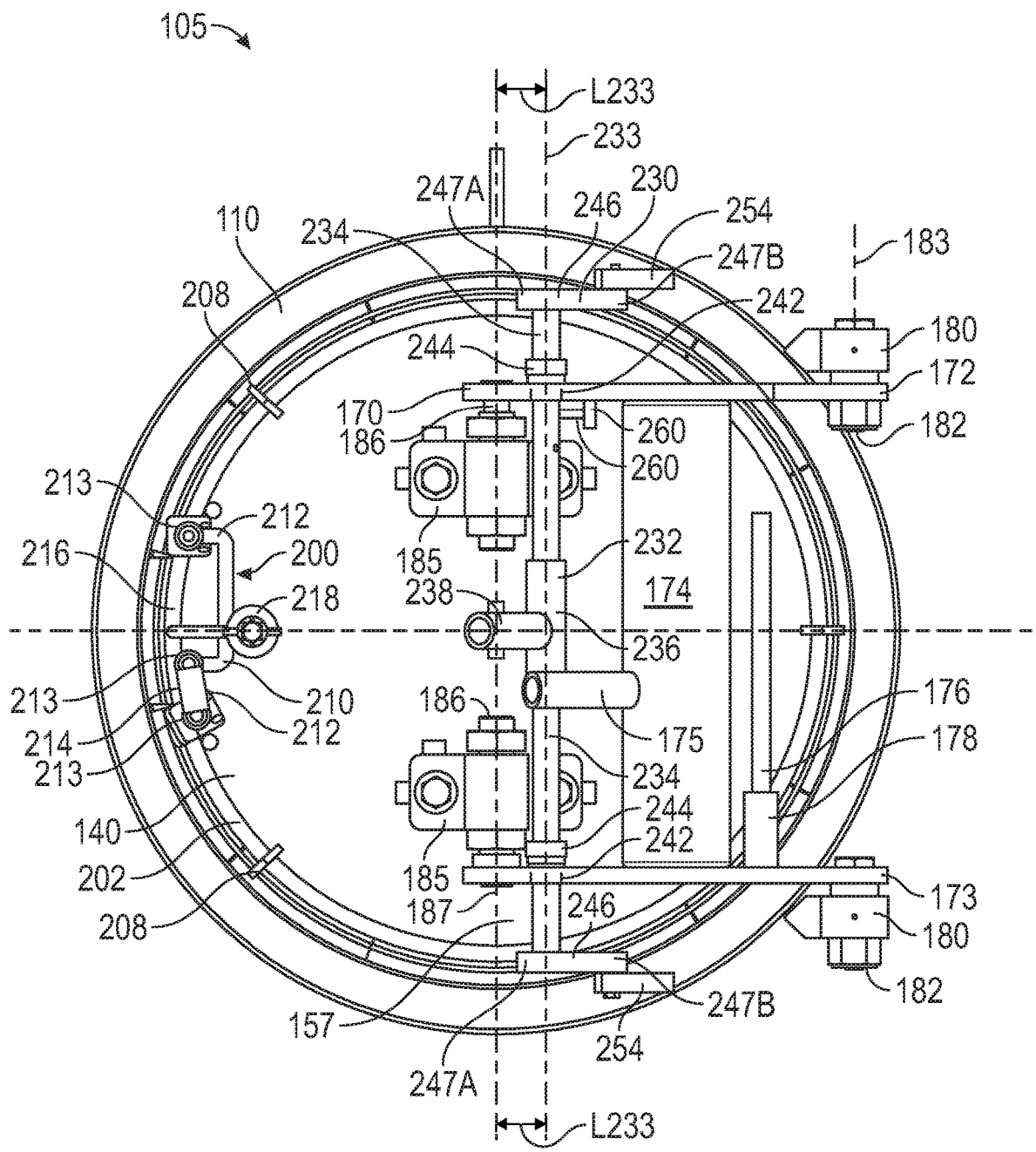
FIG. 2 shows a front, elevation view of the pressure vessel door assembly of FIG. 1.

Referring to FIGS. 1 and 2, in an exemplary embodiment, a pressure vessel 100 includes a hollow body 102 and a pressure vessel door assembly 105. The door assembly 105 includes a hub 110 that receives a door 140, the hub and door being rotationally coupled (i.e. coupled so as to allow rotation there between) by a hinge mechanism 165. Hub 110 is essentially a door frame. Door assembly 105 further includes a lock mechanism 200 configured to secure the position of door 140 within the hub 110 when the door is closed, i.e. seated within the hub 110, and includes a door actuator 230 configured to cause door 140 to engage or to disengage hub 110, selectively. That is, actuator 230 is configured to move an open door to a fully closed position and also to move a fully closed door to an open position. In this embodiment of FIGS. 1 and 2, the actuator 230 is distinct, separate from the mechanism 200 that is configured to lock door 140 once it is closed. Door 140 may be any size. In some embodiments, door 140 is sufficiently large for an operator to reach through hub 110 with a hand or with one or two arms. In other embodiments, door 140 is sufficiently large for an operator to reach through hub 110 with his head and his arms. In still other embodiments, door 140 may serve as a manway and thus be large enough for an operator to step through hub 110.

Figure 3:
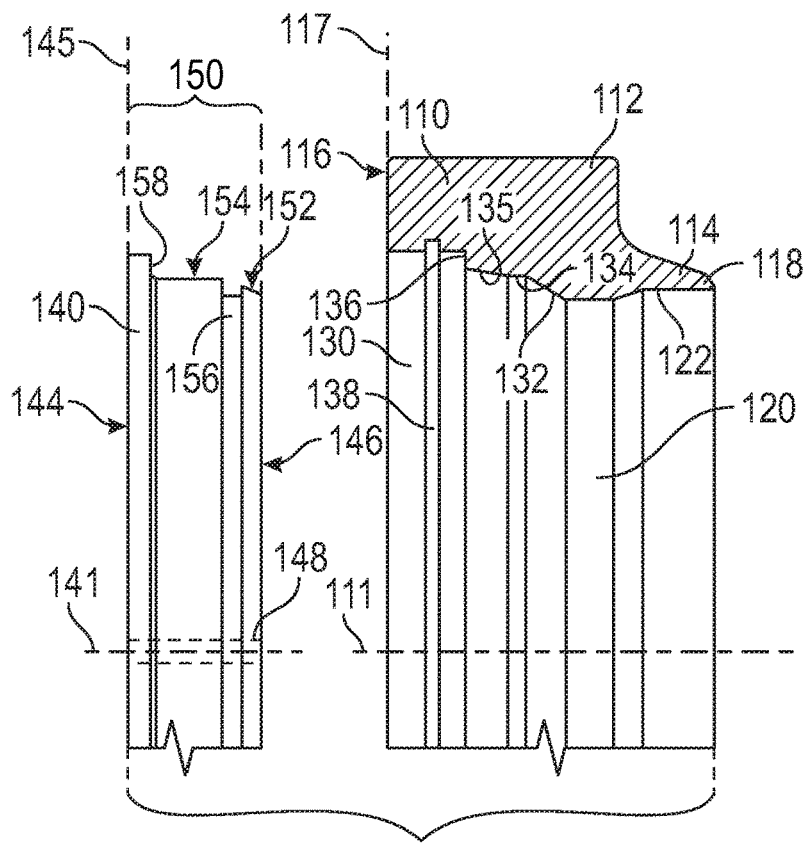
FIG. 3 shows a side view in cross-section of an upper portion of the pressure vessel door assembly of FIG. 1.

Referring now to FIG. 3, hub 110 includes a central axis 111 and an annular body 112 that tapers to a neck 114. Annular body 112 extends axially from an outer or front face 116 to an inner end 118, which terminates neck 114. In the embodiment of FIG. 3, front face 116 is generally planar, extending along a front face plane 117. Annular body 112 includes a through-passage comprising a through bore 120, an inner bore 122 extending from bore 120 to the inner end 118, and an entry bore 130 extending from front face 116 to bore 120, all being concentric and centered about axis 111 in this embodiment. Adjacent bore 120, entry bore 130 extends as a tapered surface 132, followed by a radially-inwardly-facing cylindrical surface 134, which at least in the exemplary embodiment, has a uniform radius and is, consequently, parallel to central axis 111. Continuing toward front face 116, entry bore 130 tapers radially and axially outward along a tapered face 135 and then expands radially along a shoulder 136, followed by another axially-extending internal surface in which a gland or groove 138 is formed. Tapered surface 135 is adjacent cylindrical surface 134.

Continuing to reference FIG. 3, door 140 includes a circular body centered on an axis 141, an outer or front face 144, rear or inner face 146, a circumferential outer surface 150 that extends from the rear face 146 to the front face 144, and a pressure relief port 148 proximal surface 150. An outer or front face plane 145 intersects face 144, and in the example of FIG. 3, front face 144 is generally planar and extends along a face plane 146. Rear face 146 is likewise generally planar and is disposed to be generally parallel to face plane 145 and front face 144. Starting at the inner face 146, outer surface 150 expands outward along a tapered surface 152, following an angle that corresponds to the taper of the hub's tapered surface 132. Adjacent the taper 152, the outer surface 150 further includes radially-outwardly-facing annular gland or groove 156 extending around the local circumference of door 140, followed by a radially-outwardly-facing cylindrical surface 154, and an outwardly-extending shoulder 158. Groove 156 extends around the circumference of door 140. More specifically, groove 156 extends around the local circumference that characterizes door 140 between surfaces 152, 154. Other locations of groove 156 are contemplated.

Figure 4:
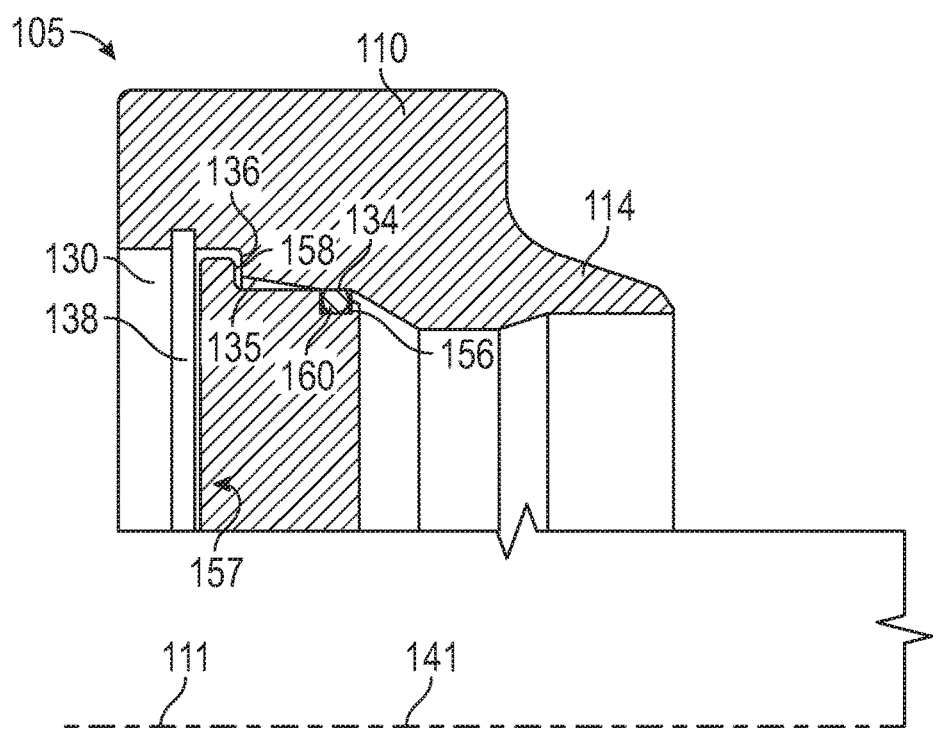
FIG. 4 shows an enlarged side view in cross-section of an uppermost portion of the pressure vessel door assembly of FIG. 1 with the door closed within the hub.

FIG. 4 shows door 140 is received concentrically within hub 110 in a closed configuration. FIG. 4 is a cross-sectional view taken along the vertical bisection plane 157 that intersects axis 141, bisecting door 140. In addition to the features described above, door 140 includes an O-ring 160 or another suitable annular seal located in groove 156. When door 140 is closed, as shown, grove 156 aligns with surface 134 and O-ring 160 forms a seal between groove 156 and surface 134. When closing door 140, the process of seating O-ring 160 within hub surface 134 involves sufficient force to merit the use of door actuator 230, which is described below. The door actuator provides a similar benefit when opening door 140, being also configured to disengage door 140 from hub 110.

Referring again to FIG. 1 and FIG. 2, hinge mechanism 165 includes a hinge arm 170 rotationally coupled to hub 110 by a pair of mounts, referred to herein as pivot blocks 180, and rotationally coupled to door 140 by a pair of mounts that are referred to herein as support blocks 185. Hinge arm 170 includes a horizontally-extending upper arm member 172 that is spaced-apart from a parallel, lower arm member 173, a hinge post 174 extending vertically between arm members 172, 173, and a lever receiver 175. A lever arm 176, which may also be called a hinge post extension, is received within a keeper 178 for use within receiver 175 when opening and closing door 140. In the example, arm members 172, 173 are formed from plate material.

As best seen in FIG. 2, hinge mechanism 165 also includes a pair of axles 182. Each axle 182 extends through the right side of an arm member 172, 173 and through the adjacent pivot block 180 forming a rotational coupling, allowing hinge arm 170 and door 140 to rotate or pivot relative to hub 110. The pair of axles 182 is aligned along a hinge axis 183 and rotate about axis 183. Axle 182 may include a shaft, a pin, or fasteners, as examples. In various embodiments, axle 182 may be rotationally free or rotationally fixed to one or both of the pivot blocks 180 or may be may be rotationally free or rotationally fixed to one or both of the arm members 172, 173, in any practical combination that provides the rotational coupling.

Hinge mechanism 165 further includes a pair of axles 186. Each axle 186 extends through the left side of an arm member 172, 173 and through the adjacent support block 185 forming a rotational coupling, allowing door 140 to rotate or pivot relative to hinge arm 170 and hub 110. The pair of axles 186 is aligned along a hinge axis 187 and rotate about axis 187. Support blocks 185 and their common axis 178 are located in the mid-region of door 140. In the example of FIG. 2, axis 187 lies in the vertical plane 157 that bisects door 140. Axle 186 may include a shaft, a pin, or fasteners, as examples. In various embodiments, axle 186 may be rotationally free or rotationally fixed to one or both of the support blocks 185 or may be may be rotationally free or rotationally fixed to one or both of the arm members 172, 173, in any practical combination that provides the rotational coupling.

Again referring to FIG. 1 and FIG. 2, lock mechanism 200 includes a collapsible-expandable lock ring 202 held near the outer edge of front face 144 on door 140 by multiple, circumferentially-spaced support brackets 208. Lock ring includes multiple ring segments coupled to a second, continuous ring. Lock ring 202 is located on door front face 144 and spans circumferentially around the most of the door except for a small arcuate portion that is spanned by a latch assembly 210, which is coupled to and extends between the ends of ring 202. Latch assembly 210 includes at least two connecting members 212 coupled to each other and to the ends of ring 202 by multiple rotational couplings 213. A lever receiver 214 is connected to one of the connecting members 212 and receives a sliding lever 215 (FIG. 1). Manual rotation of lever 215 either collapses or expands the latch assembly 210 and ring 202. When door 140 is received within hub 110, and ring 202 is radially expanded, ring 202 extends into groove 138 on hub 110 (FIG. 3), locking door 140 into its closed position. Lock mechanism 200 further includes a safety segment 216, which is a curved member that sits between the ends of ring 202 and within hub groove 138 when ring 202 is expanded. Segment 216 prevents the ends of ring 202 from moving toward each other, keeping ring 202 expanded in the locked position and engaged within hub groove 138. A pressure alert valve member or PAV 218 is coupled to segment 216 at a fixed distance but capable of rotation with respect to segment 216. A threaded end of PAV 218 is received within pressure relief port 148 on door 140 (FIG. 3) to keep segment 216 engaged within hub groove 138 while door 140 is locked and to provide an audible or tactile warning in case the fluid in the vessel 100 is pressurized when an operator attempts to unlock and open the door 140.

Continuing to reference FIG. 1 and FIG. 2, door actuator 230 includes an elongate member 232 that extends along an actuator axis 233 through a pair of aligned holes 242 (FIG. 2) in the upper and lower arm members 172, 173. Actuator 230 further includes multiple cam arms 246 fixedly coupled to member 232 and multiple brackets or cam stops 254 fixedly coupled to hub 110 which are configured to interact with cam arms 246 while closing door 140. Axis 233 is parallel to hinge axes 183, 187 and parallel to front face planes 117, 145. In reference to lateral, side-to-side position, axis 233 and cam arm 246 are located between the two pairs of blocks 180, 185 and between their axes 183, 187. Pivot blocks 180 are positioned to the right and support blocks 185 are positioned to the left of axis 233 and cam arm 246 when viewed from the front. In the exemplary embodiment shown, the lateral distance L233 between actuator axis 233 and hinge axis 187, which is aligned on door bisection plane 157, is much less than one half the radius of door 140, such that axis 233 is proximal the center of door 140.

Figure 5:
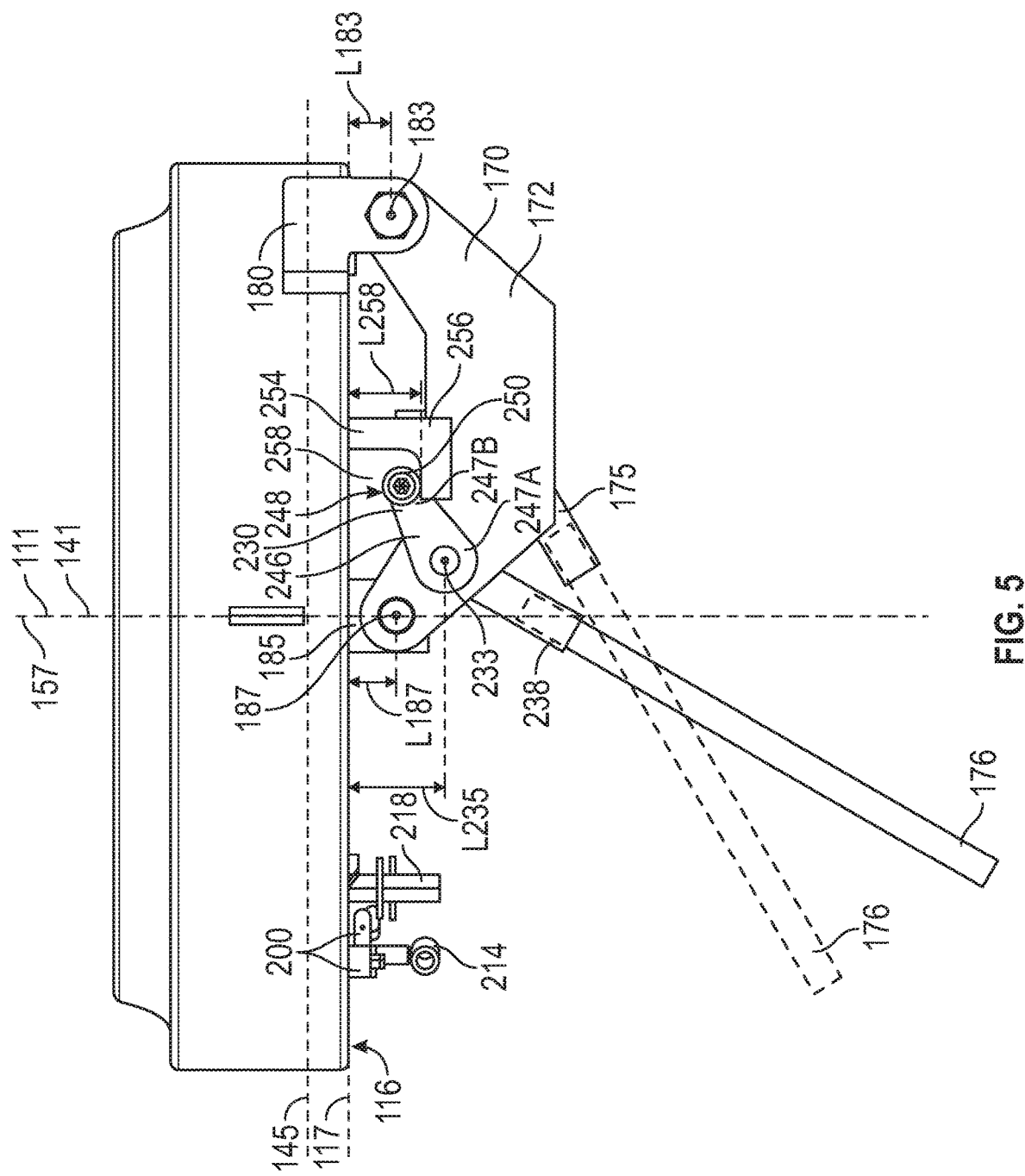
FIG. 5 shows a top view of the pressure vessel door assembly of FIG. 1.

Referring now to FIG. 5, when door 140 is closed with seal 160 seated against hub surface 134, the face planes 145, 117 are parallel, and actuator axis 233 is located further from planes 117, 145 than are the hinge axes 183, 187. Measured from the hub's face plane 117, the perpendicular distance L235 is greater than each of the perpendicular distances L183 and L187. Similar relationships exist based on the parallel plane 145. Axis 233 and elongate member 232 are oriented vertically, perpendicular to arm members 172, 173.

As best shown in FIG. 2, elongate member 232 includes extension members 234 located above and below a coupling member 236. Extension members 234 may be pipes or rods, as examples. Coupling member 236 has a lever receiver 238 that extends radially with respect to axis 233 and is configured to receive lever 176. Within each of the two holes 242, a collar 244 is positioned to receive slidingly and rotationally the member 232. The material of collars 244 is selected to insure member 232 can freely rotate within holes 242, uninhibited by friction or corrosion. Each of two cam arms 246 includes a base end 247A that is attached to either the upper or the lower end of elongate member 232 and an, action end 247B spaced-apart from member 232 and axis 233. Action end 247B is configured to interact with one of the cam stops 254.

Cam arms 246 are best described with reference to FIGS. 1 and 5. In the description that follows, the structure and operation of upper cam 246 is expressly described; however, lower cam arm 246 operates and is configured similarly. Referring now to upper cam 246 in FIGS. 1 and 5, a latch surface 248 is located at the action end 247B of upper cam arm 246. In the example shown, each latch surface 248 is an outer surface on a latch member 250 that is a protrusion extending from the action end 247B of arm 246. More specifically, latch surface 248 is the radially outer surface on a roller bearing or roller 250 coupled to cam arm 242 at action end 247B and moves with the cam arm. The rotational axis of roller 250 is attached directly or indirectly to the cam arm 246, extending therefrom, parallel to actuator axis 233. In some other embodiments, a latch surface 248 is located directly on cam arm 242 and participates in sliding contact rather than rolling contact with cam stop 254.

Cam stop 254 is generally L-shaped, having a first portion that extends in the axial direction, outward from the front face 116 of hub 110, and having a shoulder 256 that is generally parallel to face plane 117 and is off-set from plane 117. Shoulder 256 faces hub 110 and forms a pocket 258 therebetween. Pocket 258 receives roller 250. As shown in FIG. 5, the length L258 of pocket 258 from front face 116 or front face plane 117 to shoulder 256 is greater than the width of the latch member, which is the diameter of roller 250. As such, roller 250 extends only a portion of the distance between the hub front face plane 117 and the shoulder 256. In various embodiments, pocket length L258 is between 1 and 125% greater than the diameter of roller 250. As examples, in some of embodiments, pocket length L258 is between 10 and 100% greater than the diameter of roller 250, and in some embodiments, the pocket length L258 is between 10% and 110% greater than the diameter of roller 250. Other ratios or ranges of ratios between pocket length L258 and the diameter of roller 250 are contemplated. Pocket length L258 is greater than distance L183, L187 for hinge axes 183, 187 and is less than distance L235 for actuator axis 233, placing the shoulder 256 between axis 233 and axes 183, 187 as measured from face plane 117 on hub 110.

Roller 250 is located in pocket 258 when door 140 is received within hub 110. When actuator 230 is applied to close the door 140, cam arm 246 rotates clockwise about axis 233, rotating with respect to hub 110 or hinge arm 170, and roller 250 engages the shoulder 256, pushing door 140 closed and sliding O-ring 160 into hub surface 134 (FIG. 4). In at least some embodiments, when door 140 closes, O-ring 160 contacts tapered surface 135 before contacting cylindrical surface 134, which begins to compress O-ring 160, preparing it to be seated within surface 134. When actuator 230 is applied to open the door 140, cam arm 246 rotates counter-clockwise about axis 233, rotating with respect to hub 110 or hinge arm 170, and roller 250 engages the hub's front face 116, pulling door 140 and its O-ring 160 out from hub surface 134. When cam arm 246 rotates clockwise or counterclockwise about axis 233 either to move roller 250 from the hub's front face 116 to shoulder 256 or in the other direction, roller 250 is separated from both the face 116 and shoulder 256 during at least a portion of its travel because the width of roller 250 is less than distance L258. In regard to opening and closing door 140, FIG. 5 shows two installed locations of lever 176. In a first location, lever 176 extends from receiver 175 on hinge post 174 to aid with rotating hinge 165 and door 140 with respect to hub 110. To aid with opening or closing door 140, lever arm 176 may be inserted into receiver 175, and a force may be applied to arm 175 to generate a torque about hinge axis 183 and move door 140 toward or away from hub 110. In a section location, lever 176 extends from receiver 238 on actuator member 232 to aid in seating door 140 within hub 110 or removing door 140 from hub 110. After door 140 is adjacent or is partially within hub 110, to seal the door 140, seating the seal 160 within hub 110, the lever arm 176 may be inserted into receiver 175. Then, a force may be applied to arm 176 to generate a clockwise torque about actuator axis 233 (as viewed in FIG. 5). To unseal and open door 140, an opposite force in a may be applied to arm 175 to generate a counter-clockwise torque about axis 233. Receiver 238 and the lever 176, when installed, are oriented at an angle between 90 and 180 degrees from the lengthwise direction of cam arm 246. Receiver 238 and the lever 176 extend away from door 140 when the door is in a closed position. Other angles for receiver 238 and the lever 176 are contemplated.

Referring again to FIG. 2, door actuator also includes a pair of actuator stops 260 to limit the rotation of member 232 and cam arms 246. In the example shown, a first actuator stop 260 extends radially from member 232 to rotate together with member 232, and a second actuator stop 260 extends downward from the bottom of upper arm member 173. The rotational path of travel of the first stop 260 intersects the location of the second stop 260, limiting the movement of the first stop 260 and member 232.

A method for seating a pressure vessel door supported by a hinge arm that includes a rotatable door actuator is contemplated in accordance with the principles described herein. In an embodiment, using the components of FIGS. 1-4 as examples, the method includes rotating the door actuator 230 relative to the hinge arm 170, causing an annular seal 160 carried by the door 140 to seal against a hub 110 that surrounds an opening in a pressure vessel 100. After sealing the door against the hub using the door actuator, the method also includes, using a lock mechanism 200 that is spaced-apart from the door actuator to lock the door in a position that maintains the seal between the door and the hub. In various embodiments, the annular seal is an O-ring 160 disposed in a groove 156 around the door 140, and the operation of causing the annular seal carried by the door to seal against the hub includes sliding the O-ring into contact with a radially-inwardly-facing cylindrical surface 134 within the hub. In some embodiments, the operation of causing the annular seal carried by the door to seal against a hub includes applying a torque to the door actuator 230, and the method further includes releasing the torque before using the lock mechanism 200. Various embodiments of the method may include fewer operations than described, and other embodiments of the method include additional operations.

ADDITIONAL INFORMATION

Although described as being parallel to hinge axes 183, 187, in some embodiments, axis 233 and, consequently, elongate member 232 of door actuator 230 may be oriented differently. For example, axis 233 may be horizontal or may be several degrees from horizontal or several degrees from vertical if additional mounting structure were added between elongate member 232 and hinge mechanism 165 or door 140. In various embodiments, door actuator 230 is mounted to door 140 without the aid of hinge mechanism 165. Although described as being located between the support blocks 185 and pivot blocks 180, in some embodiments, door actuator axis 233 is located to the left of both hinge axes 183, 187 and thus closer to latch 200 than as shown in FIG. 2, or is mounted in door bisection plane 157 along with axis 187.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily mean that the particular step or operation is necessary to the method. The steps or operations of a method listed in the specification or the claims may be performed in any feasible order, except for those particular steps or operations, if any, for which a sequence is expressly stated. In some implementations two or more of the method steps or operations may be performed in parallel, rather than serially.

What is claimed is:

1. A pressure vessel door assembly comprising
a door;
a hub configured for attachment on the pressure vessel and configured to receive the door;
an annular seal configured to engage sealingly between the door and the hub;
a hinge arm coupled to the hub and to the door and configured to pivot relative to the hub about a first hinge axis; and
a door actuator having an elongate member extending along an actuator axis spaced-apart from the first hinge axis and coupled to the hub and coupled to the hinge arm, the elongate member configured to travel with the hinge arm when the hinge arm pivots relative to the hub, and configured to rotate about the actuator axis;
wherein the door actuator is configured to cause the seal to engage sealingly the hub and the door;
wherein the door is configured to pivot relative to the hinge arm about a second hinge axis spaced-apart from the first hinge axis and the actuator axis; and
wherein the elongate member extends through the hinge arm and is disposed at a position that is between the first and second hinge axes.

2. The assembly of claim 1 wherein the door actuator further comprises:
a cam arm including a first end coupled to the elongate member and having a latch surface; and
a cam stop extending from the hub and having a shoulder displaced from the hub;
wherein the latch surface is configured to engage the shoulder on the cam stop when the door actuator rotates in a first direction about the actuator axis.

3. The assembly of claim 2 further comprising a pocket between the hub and the shoulder of the cam stop;
wherein a latch member disposed on the cam arm is configured to be disposed in the pocket when the door is received within the hub; and
wherein the pocket length between the shoulder and a hub front face plane is between 10% and 110% greater than the width of the latch member.

4. The assembly of claim 1 wherein the door actuator comprises a lever receiver coupled to the elongate member, the lever receiver configured to receive a lever arm extending radially away from the actuator axis.

5. The assembly of claim 1 wherein the hub includes a radially-inwardly-facing cylindrical surface;
wherein the annular seal is an O-ring;
wherein the door includes a groove extending around the door and receiving the O-ring; and
wherein the O-ring is configured to engage sealingly the groove and the cylindrical surface.

6. A pressure vessel door assembly comprising:
a door;
a hub configured for attachment on the pressure vessel and configured to receive the door;
an annular seal configured to engage sealingly between the door and the hub;
a hinge arm coupled to the hub and to the door and configured to pivot relative to the hub about a first hinge axis;
a door actuator having an elongate member extending along an actuator axis spaced-apart from the first hinge axis and coupled to the hub and coupled to the hinge arm, the elongate member configured to travel with the hinge arm when the hinge arm pivots relative to the hub, and configured to rotate about the actuator axis;
wherein the door actuator is configured to cause the seal to engage sealingly the hub and the door; and
a lock mechanism configured to lock the door within the hub after the door is closed and the seal is engaged sealingly within the hub;
wherein the lock mechanism comprises collapsible-expandable lock ring extending circumferentially about and coupled to a front face of the door; and
wherein the lock mechanism is spaced-apart from the door actuator.

7. A pressure vessel door assembly comprising
a door;
a hub configured for attachment on the pressure vessel and configured to receive the door;
an annular seal configured to engage sealingly between the door and the hub;
a hinge arm rotationally coupled to the hub at a first hinge axis and rotationally coupled to the door at a second hinge axis, wherein the hinge arm comprises a first lever receiver configured to receive a lever arm and to transmit to the hinge arm a torque about the first hinge axis; and
a door actuator having an elongate member extending along an actuator axis spaced-apart from the first and second hinge axes, the elongate member rotationally coupled to the hinge arm at the actuator axis and configured to travel with the hinge arm when the hinge arm pivots relative to the hub;
wherein the door actuator comprises a second lever receiver coupled to the elongate member and configured to receive a lever arm and to transmit to the elongate member a torque about the actuator axis, the door actuator being configured to cause the seal to engage sealingly the hub and the door.

8. The assembly of claim 7 wherein the hub includes a radially-inwardly-facing cylindrical surface;
wherein the annular seal is an O-ring;
wherein the door includes a groove that receives the O-ring; and
wherein the O-ring is configured to engage sealingly the groove and the cylindrical surface.

9. The assembly of claim 7 wherein the door actuator further comprises:
a cam arm coupled to the elongate member and having a latch surface; and
a cam stop extending from the hub and having a shoulder displaced from the hub;
wherein the latch surface is configured to engage the shoulder on the cam stop when the door actuator rotates in a first direction about the actuator axis; and
wherein the cam stop is disposed at a located between the first and second hinge axes when the latch surface engages the shoulder on the cam stop.

10. The assembly of claim 9 further comprising a pocket between the hub and the shoulder of the cam stop; wherein the cam arm includes a roller, and the latch surface is disposed on the roller; and wherein the cam arm is configured such that the roller is disposed in the pocket when the door is received within the hub, and the door actuator rotates in a first direction about the actuator axis.

* * * * *